United States Patent Office 3,597,351
Patented Aug. 3, 1971

3,597,351
PURIFICATION OF AQUEOUS MEDIA BY REMOVAL OF PHENOLIC AND METAL CONTAMINANTS THEREFROM
Kurt Landenburg, St. Louis, Bernard W. Weinrich, St. Charles, and John H. Johnson, Kirkwood, Mo., assignors to Monsanto Company, St. Louis, Mo.
No Drawing. Filed Sept. 27, 1968, Ser. No. 763,351
Int. Cl. C02b 1/46
U.S. Cl. 210—32
12 Claims

ABSTRACT OF THE DISCLOSURE

Process for sorption removal and optional recovery of phenolic and/or metal contamination from aqueous media broadly. Provides purified effluent streams and recovery of potentially valuable components. Process involves specific sorption of said contaminants on insoluble basic polymer products, followed by removal from aqueous media as by filtration, and permits subsequent recovery of sorbed components by elution if desired. Process has diverse utility, including treatment of beverages to improve quality, treatment of leather industry waste for sorption including optional recovery for reuse of tannins, treatment of papermill waste water for sorption of tannins, et cetera, with concurrent alleviation of waste-disposal problems where such exist.

FIELD OF INVENTION

Sorption of phenolics, especially tannins, and/or metals from aqueous media broadly, including beverages and industrial waste effluent.

PRIOR ART

Tannins employed in current leather treating processes are a necessary beneficial ingredient but present problems of waste disposal. Tannins which do not react with proteins of the leather treated are normally discarded in waste effluent streams, leading to loss of potentially usable product and water pollution. Current methods for treating such effluent are expensive, relatively inefficient, and do not provide for recovery and reuse of the tannins.

Fermented malt beverages contain several diverse components, including tannins and oxidation-promoting metals, which contribute strongly objectionable aging effects, including the development of haze upon chilling and marked deterioration of flavor.

Current industrial processes for alleviating these problems include enzymatic digestion of haze-forming proteins and/or partial adsorption of such components on polyvinylpyrrolidone. Disadvantages associated with enzyme treatment include the fact that objectionable tannins and oxidation-promoting metals are not removed. Disadvantages accruing from use of polyvinylpyrrolidone include the facts that only incomplete removal of tannins is effected by processes consistent with leaving sufficient flavor in the beer, and that reduction of metal ion content is insufficient to impart oxidative stability.

Numerous commercial operations, e.g., chemical manufacture of phenolic compounds, lead to the discharge of such products in low concentrations into plant effluent streams, now discharged into water-ways. Debarking and related operations of the paper industry produce similar incidental results, and the desirability of removing metal ions from waste effluents, such as from the plating and related industries, is readily apparent. As a result of such operations compounded manyfold, water pollution is becoming increasingly acute and current processes for removal of trace and low levels of phenolics and metals are inadequate.

SUMMARY OF INVENTION

The present invention relates to use of certain basic polymeric compositions for the removal, via a sorption mechanism, of phenolic components and metal ion contaminants present in low concentrations in aqueous media. The invention further relates to the employment of certain basic polymeric compositions for specific and selective removal of phenolic compounds (e.g., tannins) and metal contaminants from a broad range of aqueous media by sorption. When applied in treatment of beverages, the process results in specific sorption of these components, while leaving flavor components (e.g., isohumulones) in the beverage, thereby producing a beverage with superior clarity, oxidation and chill-haze stability, color and flavor. When applied to treatment of industrial waste effluent, the process provides for sorption and optional recovery of metals and valuable phenolic components, including tannins, while at the same time alleviating water pollution problems normally associated with their disposal.

OBJECTS

The objects of the instant invention include the provision of a process for removal by sorption and optional recovery for reuse of phenolic compounds, such as tannins, from aqueous media and, when applied to plant effluents, concurrently effecting purification of waste effluent streams. A further object is the provision of a process for removal of objectional phenolics (e.g., tannins) and/or metal ions from aqueous media. Other objects will appear hereinafter and still others will be apparent to one skilled in the art.

GENERAL DESCRIPTION OF INVENTION

The sorption process of the invention can be applied to any aqueous medium containing phenols, including tannins, and/or metal ions therein low concentrations, e.g., usually below about 5% and frequently present only in trace amounts.

The process is simply conducted in any convenient manner, such as by adding basic polymer batchwise to the medium, followed by removal of basic polymer after a suitable contact time by physical means, for example, filtration, centrifugation, or the like. Alternatively, the sorption process can be conveniently conducted by passing the equeous medium over or through a column containing or comprised solely of the basic polymer. The basic polymer may also be inserted into a body of the aqueous medium in the form of a column or contained in a porous container which allows contact between the polymer and aqueous medium. A particularly convenient way of carrying out the sorption process is by effecting contact between the aqueous medium and basic polymer by containing the basic polymer in a filter unit, as by means of one or more filter plates in a conduit, and passing aqueous medium through the filter unit. In any event, contact between the aqueous medium and basic polymer is maintained for a sufficient period to enable the sorption phenomenon of the invention to have its effect. This usually requires a very short time and is ordinarily instantaneous, but increased effectiveness is usually obtained up to a point by increasing contact time. Effectiveness can also be increased by continuously or intermittently exposing fresh surfaces of basic polymer or by presenting the same for contact with the aqueous medium in a form having maximum surface area, for example, in a finely particulate granular or powder form. Recovery of adsorbed phenolics, including tannins can, if desired, be effected by usual elution procedures, employing solutions containing negative ions, for example, dilute basic or salt solutions. Recovery of metals, if desired, is also effected in similar manner.

Applications of the process are numerous and varied. Many will be immediately apparent to one skilled in the art. Purification of water for drinking or other purposes, purification of industrial waste effluent of various types, and purification of ponds or streams, industrial or otherwise, are a few examples of the broad range of application of the sorption process of the invention. When recovery of sorbed product is of interest, this too may be effected, as already indicated. Some of these many applications are illustrated by the following representative examples. Beverage clarification is a specific case in which the sorption process is especially effective and will therefore be discussed in detail hereinafter.

Fermented malt beverages such as beer and ale are today widely distributed in convenient individualized containers such as glass bottles and cans. Such containers, of course, are subject for varying lengths of time to a wide variety of temperature and other storage and shipping conditions that might adversely affect their contents. In addition, variable amounts of air, which appear to have a particularly deleterious effect on the stability of malt beverages, may enter the container during filling, thereby resulting in a reduction of the normal shelf life of the beer and in the production of haze and turbidity. Contamination by trace metals (e.g., iron and copper salts) also adversely affects beer stability.

It is, of course, necessary in order to obtain consumer acceptance, that the individual containers of malt beverage yield upon opening a product that is brilliant in visual appearance and pleasing in taste. Since the container prior to opening is commonly transported and stored for long periods of time at room temperature or higher, and then subjected to chilling conditions, it is necessary that the contents withstand such storage without change.

Fermented malt beverages such as beers, ales, and the like are produced by the fermentation with yeast of worts obtained from mashes of barley malt and grains. After fermentation, the beers so obtained are carried through various operations such as cold storage, carbonation, filtration, etc., in order to obtain the clear carbonated beverage ready for packaging. During the brewery operations, the beer is subjected to a process step known in the trade as chillproofing.

When beers or like beverages are subjected to low temperatures, as occur, for example, during conventional refrigeration and they have not been chillproofed, a haze or turbidity forms in the beer as a consequence of the presence of high molecular weight, protein-like compounds and protein-complexes involving tannins, et cetera, which tend to become insoluble when the temperature is reduced. Chillproofing is a step in the brewing process that produces a beer which will remain clear and brilliant at low temperatures. The chillproofing process was introduced to the art of brewing many years ago when the value of proteolytic enzymes for such use was first demonstrated.

One common method of chillproofing comprises treating the beer or ale after fermentation with certain proteolytic enzymes. During the next phase, or pasteurization, the enzymatic activity is accelerated to prevent formation of haze-producing complexes. A residual enzymatic activity remains after pasteurization together with peptide residues. Tannins remain essentially unaltered.

Deleterious factors, such as oxidation and the presence of traces of metals, may adversely affect the shelf life of beer not only because of well-known reactions with beer constituents to produce unstable compounds causing hazes and sediments, but also because of inactivation by further reactions of the enzymes surviving the pasteurization process of the final package. The inactivation action or reaction of the oxygen and metals on or with the enzymes may not be direct but through an intermediate action on certain oxidizable components present in beer. These compounds may form complexes or chelates with the trace metals which readily become highly oxidized to form oxygen donors which then react in turn with the enzymes.

During the course of such oxidation, these complex systems may become insoluble and contribute to the formation of hazes and turbidities and moreover adversely affect desirable foaming characteristics.

In addition to contributing to the psysical instability, residual enzymes may also adversely affect flavor stability by the same mechanism, since it is well-known that certain oxidation products possess highly undesirable flavor characteristics.

In the past, chillproofing enzymes (e.g., papain) have been added to the beer in the form of dry, comminuted solids alone or in admixture with other solid materials. (See U.S. Pats. 995,820; 995,823; 2,077,448 and 2,077,449.) More recently, liquid forms of proteolytic enzymes, alleged to have certain advantages, have become available for such use. (See U.S. Pat. 3,095,358.) All of the forms of proteolytic enzymes previously employed, and the procedures for their use in the chillproofing of beverages, have been attended by disadvantages of the type previously cited.

Other methods of chillproofing beer are known, such as the adsorption and removal by filtration of the chill-haze substances using materials such as bentonite, polyvinylpyrrolidone and nylon. Neither the proteolytic enzymes nor adsorption materials mentioned above are the most ideal chillproofing materials, since they generally result in inactivation or removal of only portions of haze-producing and destabilizing components.

It has now been discovered that a heretofore unrecognized chillproofing system resides in the employment of selected insoluble basic polymer products providing strong and selective sorption and thereby obtaining removal of haze-forming components to a degree heretofore unattainable, yielding products with exceptional chill-haze and long-term aging stability. These polymer products comprise certain basic, cationic or ampholytic moieties incorporated into the polymer molecule. The products are constituted so as to be insoluble in aqueous media, thus permitting them, together with the sorbed chill-haze impurities and metals, to be readily removed by simple filtration. Such insolubilization also permits these products to be particularly useful when incorporated into standard filter media, packed columns, etc.

Since much colloidal matter in aqueous suspension is negatively charged, these products have unusual binding capacity for the components of beverages which subsequently can lead to haze formation. This invention is based upon preparation of polymers and their derivatives with control of parameters including charge density and charge distribution at selected pH values representing those to be encountered in the beverage treatment. Control of these parameters enables one to specifically bind undesirable components.

Binding of such components is further enhanced by strong hydrogen and hydrophobic bonding potential introduced by these polymers. This bonding is unusually efficacious, since certain undesirable components including tannis may be more tightly and selectively bound and ease of removal by rapid filtration processes can be fostered by control of these factors. Gradations of bonding strengths and selectivity of bonding can be achieved by suitable selection of polymer. In a number of cases, such bonding is favored by use of a polyampholyte, i.e., a polymer containing both basic and acid groups, ionized or un-ionized (all or in part).

It has been found that heating bottled beer for successive time periods at 35–36° C., cooling to 0–4° C. for 24 hours, and optically measuring haze constitutes a reproducible test method. (Official Methods of Analysis, Association of Official Agricultural Chemists, 1965, 144–153.) Using untreated beer as control, the value of chillproofing material can be established with a fair degree of accuracy, even though the amount of turbidity produced in untreated beers may vary somewhat with the specific product under investigation, mainly due to variations in production procedures and raw materials employed by different breweries.

As previously indicated, the compositions of haze-forming complexes vary in their chemical nature. To prevent build-up of these complexes, a multiplicity of specific sorption activity is frequently useful. In such cases, sequential sorption treatments, either batchwise or in separate filters in the fluid stream may be employed. This may also be accomplished in some cases by physical admixture in a one-step process. In selected cases, it may also be desirable to combine enzymatic treatment with sorption techniques, either prior to or subsequent to sorption treatment with the subject polymers. In such cases, proteases, carbohydrases, phenolic oridases, and/or tannases can be useful either individually or more particularly in combinations, dependent upon the dominant compounds making up the haze. If an adjunct enzyme treatment is selected, however, it is preferable that insoluble enzyme products, e.g., polymer-enzyme products, be employed.

The exact form in which the insoluble basic polymer products used in the invention are employed is immaterial. The resins suitable for the practice of this invention may be insolubilized by any one of several methods including: (1) cross-linking via incorporation of a multifunctional monomer during polymer formation (e.g., copolymerization of maleic anhydride and hydrocarbon olefin, in the presence of a crosslinking agent such as a compound containing two olefinic double bonds, such as divinylbenzene, vinylcrotonate, poly-1,2-butadiene or alpha-omega-diolefins. The quantity of crosslinking agent regulates the crosslink density of the final product and will vary with the degree of insolubility desired); (2) incorporation of polyfunctional amines, alcohols, etc. during derivative formation, e.g., preparation of the three-dimension polymer network by treatment with difunctional or polyfunctional amines such as crosslinking of dibasic acid/$C_2$–$C_{18}$ monoolefin copolymers with 1–4 mole percent of hexamethylenediamine under conditions resulting in formation of di-imide crosslinks, the degree of crosslinking being determined by selection of the amount of diamine. Any of these methods of insolubilization enables one to achieve complete removal of the treating polymer and any products sorbed thereto.

The insoluble treating agent of this invention can be advantageously introduced into the brewing process at any of several stages. It can be added at the end of fermentation or to the ruh beer prior to or during low temperature storage, in which case the objectionable precursors of haze are sorbed for later removal by filtration. The treating agents may also be employed in treatment of beer by pumping of storage beer through a filter-type unit containing the insoluble polymer products. If a concurrent enzyme treatment is being utilized, such units are preferably maintained at a temperature consistent with both optimum sorption and optimum enzyme activity. The treated and filtered beer is then cooled, if necessary, bottled and, where desired, pasteurized in accordance with procedures known to the art. The invention is applicable to the various malt beverages including beers and ales and to other non-distilled alcoholic beverages including wines, syrups, cordials, liqueurs, fruit brandies, etc.

When treating any other metal or phenolic, including tannin, containing aqueous media, the exact time or stage of processing at which the method of the invention is employed is immaterial. It will be apparent, however, that the sorption process is most advantageously applied to such a medium containing the named ingredients piror to discharge of an industrial waste effluent into a stream or any other natural resource which might be involved. The process also finds application in the removal of such materials from other aqueous media, such as in the purification of water, for drinking or other purposes, in which cases the exact point at which it is applied will be readily determined on a basis of the intended purpose of the treatment, for example, whether for purification or recovery of one or more of the named materials sorbed by the process.

POLYMERIC REACTANT-CROSSLINKING-WATER INSOLUBILITY

It is understood that, according to and for the purposes of the present invention, in order to achieve the desired basic or cationic character, a substantial number (e.g., about 35–100%) of the polymer units as hereinafter defined include free amine, protonated amine or quaternary ammonium groups. The remaining polymer units may be non-functional relative to charge. They may exist in the form imparted by the original polymerization or may consist of forms originating therefrom by exposure to various buffered aqueous media which they may encounter in processing and use. They may consist of carboxyls, hydroxyls, halogens, mercaptans, amines, nitriles, etc. Additionally, such groups as the foregoing are advantageously modified at times by procedures including esterification, amidation, etc.

The initial polymer, which may be modified when necessary as described below to comply with requirements for basic groups, may advantageously be EMA or an EMA-type polymer.

Among the EMA-type polymers suitable for the practice of the instant invention, subject to the previously noted requirements for crosslinked product, are polymeric polyelectrolytes having units of the formula

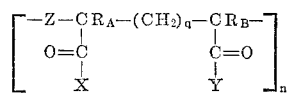

wherein: $R_A$ and $R_B$ are selected from the group consisting of hydrogen, halogen (preferably chlorine), alkyl of 1 to 4 carbon atoms (perferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) of 1 to 18 carbon atoms, preferably a bivalent carbon chain of 1 to 4 carbon atoms inclusive which is apart of a unit containing 1–18 carbon atoms, inclusive, q is zero or one, X and Y are selected from hydroxy, —O alkali metal, OR, —OH—$NH_3$, —OH—$R_3N$, —OH—$R_2NH$, OH—$RNH_2$, —NRR′, —(Q)$_p$—W—(NR′R′)$_x$ and —(Q)$_p$—W—(—OH)$_x$, providing at least about 35% of X+Y moieties are basic or cationic, wherein x is 1 to 4 and p is zero or one, wherein R is selected from the group consisting of alkyl, phenylalkyl, or phenyl, in each case of 1 to 18 carbon atoms, wherein R′ is H or R, wherein Q is oxygen or —NR′—, and wherein W is a bivalent radical preferably selected from lower-alkylene, phenyl, phenylalkyl, phenylalkylphenyl, and alkylphenylalkyl having up to 20 carbon atoms, X and Y taken together can be oxygen or —NR—, —N—W—(NR′R′)$_x$ or —N—W—(NR′R′R″)$_x^+$ wherein R, W, R′ have the meanings previously assigned and R″ is alkyl of 1 to 18 carbon atoms, benzyl or aromatic-substituted benzyl.

Many of these polymers, suitable for the practice of this invention or suitable after conversion to derivatives as described, are commercially available. Such polymers containing the requisite basic or cationic groups, are hereinafter referred to as basic-EMA-type polymers.

A preferred type of initial polymeric material, which may if necessary be modified to be included in the basic-EMA-type class, is the polymer of an olefinically unsaturated polycarboxylic acid or derivative with itself or in approximately equimolar proportions with at least one other monomer copolymerizable therewith. These polycarboxylic acid polymers can be of the nonvicinal type including those containing monomer units such as acrylic acid, acrylic anhydride, methacrylic acid, crotonic acid or their respective derivatives, including partial salts, amides and esters or of the vicinal type including maleic, itaconic, citraconic, α-dimethyl maleic, α-butyl maleic, α-phenyl maleic, fumaric, aconitic, α-chloromaleic, α-bromomaleic, α-cyanomaleic acids, including their partial salts, amides and esters. Anhydrides of any of the foregoing acids are advantageously employed.

Comonomers suitable for use with the above functional monomers include α-olefins such as ethylene, propylene isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an afterreaction modification of an existing copolymer. In any event, major modifications of polymer are made when necessary to ensure the presence of 35 percent or more of such groups which bear a basic or cationic moiety.

The initial copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines or ammonia. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl or other aryl groups.

In the formation of the requisite basic or cationic units, particularly useful derivatives are those in which carboxyl groups are partially replaced, within the defined limits, with moieties bearing amine or amine salts, including quaternary salt groups. These are conveniently formed by reaction of the carboxyls of their anhydride precursors, where applicable, with polyfunctional amines such as dimethylaminopropylamine or dialkylaminoalcohols such as dimethylaminoethanol, the former forming an amide linkage with the polymer or in certain cases at higher temperatures forming an imide linkage with vicinal carboxyls, and the latter forming an ester linkage. Such pendant free amine groups can then be converted, if desired, to their simple or quaternary salts. Suitable selection of the above derivatives permit control of several parameters of sorption performance for the practice of the instant invention.

Further, as already indicated, for the polymers employed to have the desired basic or cationic character, a substantial number (e.g., about 35–100%) of the polymer units contains basic or cationic groups. Such products are further illustrated by the following general examples.

Partial imides of a starting carboxyl or carboxylic acid anhydride containing polymer, e.g., EMA, are produced by:

(A) Heating a limiting amount of a primary, secondary, or tertiary aminolower-alkylamine with a water solution of the hydrolyzed or carboxyl-containing form of the polymer in vacuo at a temperature of about 140–150° C. until a constant weight has been reached and water is no longer given off. Such a reaction simultaneously results in formation of imide groups in proportion to the amount of amine added and in the reformation of anhydride groups for the remainder of the polymer units. In this manner, imide-polymer products are formed which possess 35–100% imide linkages, the remaining carboxyl groups, when present, being in the anhydride form.

(B) Alternatively, a partial amine-polymer product may be converted to the partial imide polymer product by heating a partial amide-polymer product in vacuo at 140–150° C. until water is no longer given off. Such an imide polymer product likewise possesses comparable proportions of imide and anhydride groups depending upon the number of amide groups originally contained in the starting partial amide-polymer product.

Partial primary, secondary or tertiary aminoloweralkylamides of the starting carboxyl or carboxylic acid anhydride-containing polymer, e.g., EMA, are obtained by contacting the polymer with a limiting amount of the selected amine in suspension in a solvent such as benzene or hexane, resulting in formation of a partial amide-anhydride derivative of the polymer, or a corresponding amide-carboxylate derivative thereof. The number of amide groups is dependent upon the quantity of the amine used as compared with the quantity of polymer employed. Such amide-polymer products comprise 35–100% amide groups, with remaining carboxyl groups being present as anhydride groups.

Partial aminoester-polymer products are most conveniently prepared by heating at reflux temperatures overnight a limiting quantity of the selected aminoalcohol and carboxyl or carboxylic acid anhydride-containing polymer, e.g., EMA, in a dry organic solvent such as toluene or dimethylformamide and with the optional use of an acidic or basic catalyst such as p-toluene-sulfonic acid or sodium alkoxide. The resulting product contains ester groups, carboxylic acid groups and anhydride groups, the respective numbers of which are determined by the quantity of aminoalcohol used in the reaction compared to the amount of polymer employed and, in some cases, by the temperature at which the reaction is carried out.

Suitable blocking and unblocking of the amine moiety of the reactant employed in preparing amides, esters or imides may be effected when required. Residual, non-modified, polymer units may optionally be converted to neutral groups or units by attachment to the polymer molecule of compounds including alkylamines, aminoalcohols, and alcohols.

Alternatively, the cationic character of the polymer can be provided through incorporation of monomers which impart a basic or cationic character such as C-vinyl pyridines, vinyl amine, the several amino-substituted vinyl benzenes (or toluenes, etc.), amine-bearing acrylates (or methacrylates, etc.), vinyl imidazole, etc.

Thus, in any event, the polymer product, after provision for sufficient crosslink units to provide requisite insolubility in aqueous media, will have residual active or reactive groups which may be of various types, but these residual active or reactive groups or residual "reactive sites" in the polymer will in one way or another comprise a certain percentage, about 35–100%, preferably about 60–100%, which are of a basic or cationic nature, so as to import the requisite basic or cationic nature to the polymer product.

Representative dibasic acid or anhydride-olefin polymers, especially maleic acid or anhydride-olefin polymers, of the foregoing type (EMA-type) are known, for example, from U.S. Pats. 2,378,629; 2,396,785; 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the inter-polymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation, or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product (EMA) is commercially available. It is also available in various molecular weights, e.g., EMA-11, -21 and -31, respectively, having molecular weights of about 2,000–3,000, 20,000–30,000, and 60,000–80,000, any of which may be used for preparation of products employed in the present invention, since insolubilization by croolinking leads to an infinite molecular weight product.

The maleic anhydride copolymers thus obtained have repeating anhydride linkages in the molecule, which are readily hydrolyzed by water to yield the acid form of the copolymer, rate of hydrolysis being proportional to temperature. In view of the fact that the sorption of chill-forming components is carried out in aqueous media, any residual anhydride which may remain after formation of the basic or cationic derivatives is usually converted to the acid form or to the respective salt form either prior to or during treatment. Alternately, these residual groups may be in their anhydride form at time of treatment or may be converted to any of several derivatives as described previously.

The term "water-insoluble," as already stated, when applied means that the product concerned does not dissolve in water or aqueous solutions, even though it may have such characteristics as a high degree of swelling due to solvation by water, even to the extent of existence in a gel form. "Water-insoluble" products can be separated from the media by methods including filtration, centifugation, or sedimentation. Such characteristics are imparted by crosslinking as previously described. The degree of crosslinking, i.e., crosslinking density, relates to the percentage of interchain linkages relative to the total functional units of the polymer. It is an important variable governing the properties and performance of the three-dimensional crosslinked network. Parameters related thereto include the surfaces available for sorption and the flow rates achievable in a packed-column filtration operation. It is generally desired that sufficient crosslinking be introduced to assure freedom from undesirable plugging of filter media and not so dense as to unduly limit surfaces available for sorption. In general, percentages of crosslinker giving compositions operable in the instant invention are in the range of 0.5 to 10 mole percent of the total polymer units and preferably in the range of 1 to 4 percent.

Preferred polymers are selected from the group consisting of

Basic or cationic ethylene/maleic anhydride copolymers
Basic or cationic isobutylene/maleic anhydride copolymers
Basic or cationic 2-methyl-pentene-1/maleic anhydride copolymers
Basic or cationic styrene/maleic anhydride copolymers
Basic or cationic vinyl methyl ether/maleic anhydride copolymers
Basic or cationic vinylacetate/maleic anhydride copolymers
Basic or cationic divinylether/maleic anhydride cyclopolymers
Basic or cationic α-methylstyrene/maleic anhydride copolymers
Basic or cationic polymaleic anhydride polymers
Basic or cationic polyacrylic anhydride polymers
Basic or cationic polyacrylic acid polymers, and
Basic or cationic polymethacrylic acid polymers.

It has unpredictably been found that these insoluble basic polymers can be used as treating agents according to the present invention and are exceptionally effective in removing tannis (e.g., tannic acid) and less complex phenols (e.g., phenol) from dilute concentrations thereof in aqueous media. It has further been found that these sorbed products can be eluted from the sorbent basic polymer by treatment with dilute base (e.g., 0.1 N NaOH) or with brine (e.g., 0.1 N KCl), thus providing concentration into a form suitable for recovery and reuse, if desired.

The basic polymeric products employed in this invention are particularly useful when employed in filtering devices designed to promote maximum contact consistent with practical throughput. Such devices are preferably maintained at temperatures affording optimum sorption. Alternatively, the insoluble basic polymer, e.g., basic-EMA-type polymer, products are admixed with batches of media. In the case of a beverage, this is usually during storage or prior to filtering and bottling. In each case, the basic polymeric products, together with sorbed tannins and metals, are removed as by filtration. In beer treatment, this may be by a final filtration prior to bottling.

Optimum sorption of these contaminants is favored by control of pH of the media as may be required, based on the nature of the sorbent and material being sorbed. The pH should be such that the insoluble-basic polymers used in the invention are protonated and bear a positive charge, while the contaminants bear a negative charge. Colloidal matter in aqueous suspension commonly bears a negative charge, but pH can be lowered to a degree such that certain contaminant components may lose their negative charge and sorption thus be somewhat impaired. Conversely, pH can be raised to such a degree that certain basic polymer sorbents will not be protonated, in which case sorption may again be somewhat impaired. In the case of beer and other aqueous media treatment, the insoluble-basic polymer sorbents are protonated at pH's normally associated with the aqueous media treated (e.g., beer, which has a pH of about 3–6, usually 4–5) and sorbable impurities, e.g., tannins, other phenolics and metals, bear sufficient negative charge at these pH values to favor excellent binding and sorption. Waste water effluents from papermills usually have an acid pH, e.g., about 5, and phenolic production is generally also in the acidic range. However, when the effluent is not within the effective sorption pH range, pH adjustment is simply effected. In general, the basic-polymers used in the instant invention are efficient in removing phenolics, tannins and metals from aqueous media containing same at pH values ranging from pH 3 to about 9. Quaternary ammonium salts are particularly effective at the higher pH ranges mentioned, but adjustment of pH of the aqueous medium treated to an acid pH may sometimes be advantageously effected for maximum sorption effect.

DESCRIPTION OF THE PREFERRED EMBODIMENTS

The following preparations and examples are given by way of illustration only, and are not to be construed as limiting.

EXPERIMENTAL

Preparation 1. — Insoluble, crosslinked dimethylaminopropylimide (100%) of ethylene/maleic anhydride copolymer Xylene (1 liter) was added to a three-necked, round-bottom flask equipped with reflux condenser, Dean-Stark water trap and stirrer. Methylimino-bis-propylamine (4.0 mole percent by weight of anhydride polymer, i.e., 2.0 moles for 0.5 mole of polymer) was added with stirring. Ethylene/maleic anhydride copolymer (EMA-31, MW ca. 60,000–80,000) (0.5 mole) was sifted into the stirred mixture, and it was then heated to reflux temperature (ca. 140–142° C.) for 2–3 hours to remove water. The product at this stage comprises a three-dimensional crosslinked structure in which 8 mole percent of the anhydrides are involved in the crosslinking reaction.

The mixture was cooled to 100° C. and dimethylaminopropylamine (0.5 mole or 8 percent excess by weight based on remaining anhydride groups) was added dropwise over a ten-minute period. The mixture was returned to reflux for 4 hours or until water ceased to be evolved. It was then cooled, diluted 3:1 with hexane, the supernatant decanted, and the solid product washed twice with 3 liters of hexane. The product was then filtered and dried overnight under vacuum at 60° C. The yield was 93 percent of theory and infrared examination showed the product to be free from both carboxyl and anhydride groups.

This product is referred to hereinafter as the 100 percent dimethylaminopropylimide of ethylene/maleic anhydride copolymer and is abbreviated as follows: EMA·DMAPAI (100%), indicating that essentially 100 percent of the anhydride groups which are not involved in the crosslinking reaction have been converted to the respective imide derivatives. Similar abbreviations apply to the following examples.

Preparation 2. — Insoluble, crosslinked dimethylaminopropylimide (70%) of ethylene/maleic anhydride copolymer The product, insoluble EMA·DMAPAI (70%), in which crosslinking was effected as described in Preparation 1, and in which 70 percent of the remaining anhydride groups are converted to dimethylaminopropylimide derivatives by using the stoichiometric amount of amine consistent therewith, and in which this partial imide formation was accomplished as described in Preparation 1, was prepared. The composition was confirmed by infrared and nitrogen analysis.

Preparation 3. — Insoluble, crosslinked dimethylaminopropylimide (5%) of ethylene/maleic anhydride copolymer This product, insoluble EMA·DMAPAI (5%), was prepared substantially in the manner of Preparation 2 and was characterized by nitrogen and infrared analysis.

Preparation 4. — Insoluble, crosslinked dimethylaminopropylimide (100%) of isobutylene/maleic anhydride copolymer The product, insoluble IBMA·DMAPAI (100%), was prepared as described in Preparation 1, using the copolymer of isobutylene and maleic anhydride (MW ca. 100,000) as the starting polymeric material. The product was substantially free of acid and anhydride groups as indicated by infrared absorption patterns.

Preparation 5. — Insoluble, crosslinked dimethylaminopropylimide (70%) of isobutylene/maleic anhydride copolymer The product, insoluble IBMA·DMAPAI (70%), was prepared in a manner as described in Preparation 2, using the copolymer of isobutylene and maleic anhydride as the starting polymer product. The product was characterized as previously described.

Preparation 6. — Insoluble, crosslinked dimethylaminopropylimide (100%) of 2-methyl-pentene-1/maleic anhydride This product, insoluble MPMA·DMAPAI (100%), was prepared from MPMA (MW ca. 20,000) and characterized substantially as described in Preparations 1 and 4.

Preparation 7. — Insoluble, crosslinked dimethylaminopropylimide (70%) of 2-methyl-pentene-1/maleic anhydride copolymer This product, insoluble MPMA·DMAPAI (70%), was prepared and characterized as described in Preparations 2 and 5.

Preparation 8. — Insoluble, crosslinked dimethylaminopropylimide (100%) of styrene/maleic anhydride copolymer This product, insoluble SMA·DMAPAI (100%), was prepared in the manner of Preparation 1, except that the styrene/maleic anhydride copolymer (MW ca. 40,000) was crosslinked with 4 mole percent of divinylbenzene during its preparation and prior to reaction with dimethylaminopropylamine.

Preparation 9. — Insoluble, crosslinked dimethylaminopropylimide (20%) of styrene/maleic anhydride copolymer This product, insoluble SMA·DMAPAI (20%), was prepared substantially in the manner of Preparation 8, using the stoichiometric amount of dimethylaminopropylamine required to produce imide formation with 20 percent of the polymer units not involved in crosslinking.

Preparation 10.—Insoluble, crosslinked dimethylaminopropyl amide-acid (100%) of ethylene/maleic anhydride copolymer Ethylene/maleic anhydride copolymer (0.5 mole) is crosslinked with methylimino-bis-propylamine as already described in the first part of Preparation 1. To the crosslinked polymer in xylene solution is added the dimethylaminepropylamine (0.5 mole or 8 percent excess for formation of the amide-acid groups from the remaining anhydride groups). This mixture is held, with stirring, at 90–100° C. for 4 hours. The product is isolated by dilution with an equal volume of hexane, decantation, two washes with 3 litres of hexane, and drying in a vacuum oven at 60° C. for 18 hours. Infrared analysis of the product indicates that substantially all of the anhydride groups, which are not involved in the crosslinking reaction, are converted to the dimethylaminopropyl-amide-acid derivatives. This product is henceforth referred to in abbreviated form as Insoluble EMA·DMAPAA (100%).

Preparation 11.—Insoluble, Crosslinked dimethylaminoethyl half-ester of ethylene/maleic anhydride copolymer Ethylene/maleic anhydride copolymer (0.5 mole) is crosslinked with methylimino-bis-propylamine as in Preparation 1. To the crosslinked polymer, suspended in toluene, is added 0.5 mole of dimethylaminoethyl alcohol (this is an 8 percent excess for formation of the half-ester, half-acid derivative). An acid catalyst (p-toluenesulfonic acid, 0.1% by weight of polymer) is added and the mixture heated with stirring to 90–100° C. for 18 hours. The half-ester product is isolated by pouring the suspension slowly into hexane, washing by decantation three times with 3 liters of hexane per washing, and drying in a vacuum oven at 60° C. for 24 hours. Infrared studies indicate that the product is essentially free from residual anhydride groups and nitrogen analysis indicates substantially complete conversion to the half-ester form. This product is henceforward referred to in abbreviated form as Insoluble EMA·DMAE-half-ester (100%).

Preparation 12.—Insoluble, crosslinked dimethylaminopropyl diamide (100%) of ethylene/maleic anhydride copolymer EMA·DMAPAA (100%), the product of Preparation 10 (0.5 mole), is dissolved in water as a 5% solution. Dimethylaminopropylamine (0.55 mole) is reacted with the polymer solution after first activating the residual carboxyl groups by adding a water-soluble carbodiimide, 1-ethyl-3-(3 dimethylaminopropyl)-carbodiimide (0.55 mole) and stirring for about 5–10 minutes prior to addition of the amine. The reaction is carried out with stirring for 4 hours at room temperature. The product is converted to its protonated form by lowering the pH to the range of 2–4 and is recovered from solution by precipitation in acetone. The product is washed with acetone and dried in a vacuum oven at 60° C. for 24 hours. This product is substantially the diamide derivative of residual anhydride (or amide-acid) units (i.e., of those not involved in crosslinking) as indicated by nitrogen analysis and infrared absorption patterns. It is abbreviated as insoluble EMA·DMAPA-diamide (100%).

Preparation 13.—Insoluble, crosslinked dimethylaminoethyl (half-ester, dimethylaminopropyl half-amide (100%)

EMA·DMAE-half-ester (100%), the product of Preparation 11 (0.5 mole), is converted to the ester-amide derivative in a manner substantially as described for such amide formation in Preparation 12. The final product, EMA·DMAE-half-ester, DMAPA-half-amide (100%), represents conversion of residual anhydride groups of the original maleic anhydride copolymer into the half-DMAE ester, half-DMAPA amide, with substantially all of such groups being so converted as indicated by nitrogen analysis and infrared absorption.

Preparation 14.—Insoluble, crosslinked dimethylaminoethyl diester (100%) of EMA

In the manner of Preparation 12, the dimethylaminoethyl diester of EMA-31 is obtained by coupling of dimethylaminoethanol to carboxyl groups of starting crosslinked hydrolyzed EMA-31.

In the same manner, other amines may be used to impart basic or cationic character to the polymers of this invention. These include dilower-alkylaminolower-alkylamines, monolower-alkylaminolower-alkylamines, in addition to aminolower-alkylamines, dilower-alkylaminolower-alkyl-alcohols, monolower-alkylaminolower-alkyl-alcohols, and aminolower-alkylalcohols. These compounds can be used to modify residual functional groups not involved in the crosslinking reaction to form partial or complete conversion to imides, half-amide half-acid (or salts), diamides, half-ester half-acid (or salts), diesters, and any selected mixtures thereof. As previously indicated, such operable derivatives are preferably designed such that a substantial number (e.g., about 35–100%) of the residual polymer units include free amine, protonated amine or quaternary ammonium groups. Within these limits, a number of the polymer units may be converted to non-base or non-cation units (e.g., amides, imides or esters) by reaction with alkyl or aryl amines, alkyl-alcohols, or aromatic-alkyl alcohols.

Example 1.—Use of insoluble, crosslinked dimethylaminopropylimide (100%) in beverage chillproofing To demonstrate the binding capacity of polymers exemplifying the insoluble basic-EMA-type previously described, beer was treated with crosslinked IBMA·DMAPAI (100%), Preparation 4. Beer (3.8 kg.), prior to pasteurization, was treated with the above crosslinked polymer (1 g.) by intermittent shaking for a period of 4 hours at 4° C. It was then filtered through a Millipore (TM) filter, bottled, pasteurized, and tested for haze formation as previously described. This beer was found to be free of haze-forming compounds as demonstrated by the total absence of chill haze after one week aging at 36° C.

EXAMPLES 2–6

(2) Use of insoluble, crosslinked dimethylaminopropylimide (100%) of styrene/maleic anhydride copolymer in beverage chillproofing
(3) Use of insoluble, crosslinked dimethylaminopropylimide (20%) of styrene/maleic anhydride copolymer in beverage chillproofing
(4) Use of insoluble, crosslinked dimethylaminopropylimide (5%) of ethylene/maleic anhydride copolymer in beverage chillproofing
(5) Use of commercial polyvinylpyrrolidone in beverage chillproofing
(6) Use of commercial papain enzyme treatment in beverage chillproofing In the manner of Example 1, other insoluble, crosslinked EMA-type polymers were tested for their ability to remove beer components leading to chill haze production. These results, including those for Example 1, are shown in Tables I and IV.

TABLE I.—RELATIVE REMOVAL OF CHILL-HAZE COMPONENTS FROM BEER [1]

| Treating agent | Preparation Number | Days of aging at 36° C. | | | | | | |
|---|---|---|---|---|---|---|---|---|
| | | 1 | 2 | 3 | 4 | 5 | 6 | 7 | 14 |
| Control | | 268 | 355 | | | | | | |
| Commercial papain enzyme | | 74 | 87 | 88 | | | | 147 | 275 |
| Commercial polyvinylpyrrolidone | | 95 | 102 | 106 | 120 | 123 | 135 | 144 | 193 |
| IBMA·DMAPAI (100) | 4 | 72 | 75 | 72 | 74 | 73 | 73 | 72 | 73 |
| SMA·DMAPAI (100) | 8 | 148 | 169 | 185 | 218 | 218 | 235 | 248 | 302 |
| SMA·DMAPAI (20) | 9 | 207 | 300 | | | | | | |
| EMA·DMAPAI (5) | 3 | 176 | 248 | 367 | | | | | |

[1] All beer was filtered through a Millipore (TM) filter prior to bottling and pasteurized after bottling at 60° C. for 15 minutes. Readings are from a standard hazemeter test after chilling the beer for 24 hours at 0° C. Method as described in Official Methods of Analysis, Association of Official Agriculture Chemists, 1965, pp. 144–153.

TABLE II.—RELATIVE REMOVAL OF COLOR BODIES (E.G., TANNIN-METAL COMPLEXES) FROM BEER

| Treating agent | Preparation Number | Amount of solids on filter | Color of solids on filter |
|---|---|---|---|
| None | | Very little | Very light tan. |
| Commercial papain enzyme. | | do | Do. |
| Commercial polyvinylpyrrolidone. | | Medium | Light tan. |
| EMA·DMAPAI (70) | 2 | Light | Medium tan. |
| EMA·DMAPAI (100) | 1 | Medium | Light brown. |
| SMA·DMAPAI (20) | 9 | | Do. |
| SMA·DMAPAI (100) | 8 | Very heavy | Dark tan-brown. |
| IBMA·DMAPAI (70) | 5 | Heavy | Medium brown. |
| IBMA·DMAPAI (100) | 4 | do | Dark tan-brown. |
| MPMA·DMAPAI (70) | 7 | Light | Light tan. |
| MPMA·DMAPAI (100) | 6 | do | Medium tan. |

TABLE III.—EFFECT OF BASIC-POLYMER TREATMENT ON COMPONENTS OF BEER

| Treating agent | Preparation Number | Iron, p.p.m. | Copper, p.p.m. | N (percent) | Isohumulones, p.p.m. | Color index |
|---|---|---|---|---|---|---|
| Control | | 0.26 | 0.06 | 0.054 | 13 | 3.8 |
| Commercial polyvinylpyrrolidone | | 0.39 | 0.08 | 0.052 | 13 | 3.7 |
| IBMA·DMAPAI (100) | 4 | 0.09 | 0.01 | 0.054 | 12 | 3.0 |
| SMA·DMAPAI (100) | 8 | 0.06 | 0.02 | 0.052 | 11 | 2.6 |

TABLE IV.—RELATIVE REMOVAL OF CHILL-HAZE COMPONENTS FROM BEER

| Treating agent | Preparation Number | Days of aging at 36° C. | | |
|---|---|---|---|---|
| | | 3 | 7 | 14 |
| Control | | >900 | | |
| Commercial papain chillproofing enzyme | | 132 | 218 | 360 |
| IBMA·DMAPAI (70) | 5 | 143 | 187 | 217 |
| IBMA·DMAPAI (100) | 4 | 61 | 63 | 60 |
| EMA·DMAPAI (70) | 2 | 98 | 102 | 146 |
| EMA·DMAPAI (100) | 1 | 86 | 92 | 137 |
| 2-MP-1/MA·DMAPAI (70) | 7 | 222 | 722 | |
| -MP-1/MA·DMAPAI (100) | 6 | 89 | 122 | 200 |
| MA·DMAPAI (100) | 8 | 122 | 153 | 150 |

Test methods used are described in Official Methods of Analysis, Association of Official Agriculture Chemists, 1965, pp. 144–153. Additional results relative to quantity and color of substances (e.g., tannin, etc.) removed by filtration removal of the polymer with sorbed matter are presented in Table II. Further data showing effective removal of iron and copper ions and reduction of color of the final beer are given in Table III. Data is also presented showing effect on protein content (i.e., as shown by percent nitrogen) and isohumulones of these sorption treatments. It is indeed surprising and unexpected to find that the undesirable tannins, metal ions and color bodies are removed with exceptional efficiency, while at the same time the desirable isohumulones and potentially desirable proteins are left behind, thereby permitting one to produce a beer with superior clarity, stability and taste. These data demonstrate that polymers with a high level of basic groups, both polyampholytic and polybasic, are preferred and by far the most effective in chillproofing. It is also observed from data in Table III that effective chill-proofing has been achieved by products of the present invention without removal of protein. This can be considered advantageous with respect to retention of foaming properties and certain desirable flavors.

EXAMPLES 7–15

Use of insoluble, crosslinked basic EMA-type polymer products in beverage chillproofing and comparison with commercial treatments Table IV shows the results of additional chillproofing performance achieved by treatment in a manner described in Example 1 and using the insoluble, crosslinked basic-EMA-type products described in Preparations 1, 2, 4, 5, 6, 7, and 8. These data again confirm the superior performance of these preparations containing higher amounts of basic groups. Best performance was generally obtained with the 100% imide derivatives. However, both the EMA and the IBMA 70% imide derivatives gave good chillproofing performance at least equivalent to commercial treatments.

EXAMPLE 16

Use of insoluble, crosslinked basic EMA-type amide-acid polymer products in beverage chillproofing; insoluble crosslinked dimethylaminopropylamide-acid (100%) of ethylene maleic anhydride copolymer EMA·DMAPA-amide-acid, Preparation 10, is added to beer at the level of 0.5 gram per gallon of beer. The mixture is intermittently agitated over a period of 2 hours, filtered, bottled, pasteurized and tested for chill-haze and aging stability in the manner previously described. This beer exhibits excellent chill-haze stability with additional observations of lower metal content and enhanced flavor.

EXAMPLE 17

Use of insoluble, crosslinked basic EMA-type half-ester, diamide, and half-ester half-amide products in beverage chillproofing In a manner similar to that described in Example 16, the following polymer products are found to exhibit excellent removal of chill-haze components providing a beer of exceptional stability and flavor:

(a) EMA·DMAE-half-ester (100%), Preparation 11.
(b) EMA·DMAPA-diamide (100%), Preparation 12.
(c) EMA·DMAE-half-ester, DMAPA-half-amide, Preparation 13.
(d) EMA·DMAE-diester (100%), Preparation 14.

It will be obvious that other or additional conventional treatments, whether sorption, enzymatic, or of another type, may be used in combination with the sorption process of the present invention, if desired.

In the manner of the chillproofing operations described in the preceding examples, insoluble basic polymer products including the amides, imides, esters and mixtures thereof prepared as described using dilower-alkylaminolower - alkylamines, monolower-alkylaminolower-alkylamines, monolower-alkylamines, dilower-alkylamino-lower-alkyl-alcohols, monolower-alkylamino-lower-alkyl-alcohols and amino-lower-alkylamino-alcohols are used in chillproofing beverages. The beverage products are found to have superior clarity, oxidative stability, chill-haze resistance and lower metal ion contents.

EXAMPLE 18

Sorption of tannin (tannic acid) from aqueous media by insoluble basic dimethylaminopropylamine imide of isobutylene/maleic anhydride copolymer Tannin (i.e., tannic acid) was dissolved in distilled water. 1 g. in 90 ml. of water. The solution was filtered, first through filter paper (whatman No. 1) and then through a 0.45μ Millipore (TM) filter. To this solution was added 0.5 M sodium acetate buffer, pH 4.0 (10 ml.) to yield a final solution which was 0.05 M in sodium acetate and which had a measured pH of 3.86. Based on optical density (OD) measurements at 390 mµ, it was determined that the solution contained 755 mg. of dissolved tannin.

The solution was then contacted with insoluble IBMA·DMAPAI (100%), Preparation 4 (100 mg.) and the suspension stirred for about 10 minutes. The solution was filtered through a 0.45µ Millipore (TM) filter to dryness. The filtrate was analyzed for tannic acid concentration by optical density and the amount removed by sorption on the insoluble basic polymer was calculated. It was found that 292 mg. had been sorbed and removed by 100 mg. of the polymer product.

EXAMPLE 19 pH variation

In the same manner as given in Example 18, using the same concentrations and the same conditions otherwise, it was found that 129 mg. of tannin was sorbed by 100 mg. of basic polymer product at a pH of 5.2.

EXAMPLE 20

Tannin recovery

The insoluble-basic IBMA·DMAPAI (100%) complex with tannin attached (as obtained in Example 18) was treated with 0.5 N sodium hydroxide (100 ml.) on the filter used in Example 18 for about 10 minutes and the solution recovered by drawing through the filter. Optical density measurements showed essentially quantitative recovery of the sorbed tannin.

Similar results are obtained over broad ranges of NaOH concentration from about 0.05 to about 1 N and even higher. Similar elution results are also obtained using 0.05–2 N and even higher KCl (brine) concentrations.

In the same manner, the basic polymer with sorbed tannin, obtained in Example 19, was treated with the identical results.

EXAMPLE 21

Sorption of nitrophenol from aqueous media by insoluble basic dimethylaminopropylimide (100%) of ethylene/maleic anhydride copolymer Nitrophenol was sorbed from aqueous media in which present in dilute concentration (ca. 1%) in the manner described in Example 18. The basic polymer sorbed 450 mg. of the nitrophenol per gram of polymer product (prepared as in Preparation 1).

In exactly the same manner, phenol itself is sorbed from aqueous solution in which it is present in a concentration of about 0.5%, using the methyl iodide quaternary salt of the basic sorbent of this example. Other phenols sorbable in the same manner include halophenols, alkylphenols, arylphenols, cresols, catechols, hydroquinones, polyphenols, bile acids, gallic acid, pyrogallols, anthocyanidins etc.

EXAMPLE 22

Phenol recovery

The adsorbed nitrophenol from Example 21 was recovered essentially quantitatively by elution exactly in the manner of Example 20.

Similarly, the adsorbed phenol of Example 21 was also recovered essentially quantitatively from the basic polymer sorbent by elution in the manner of Example 20.

EXAMPLE 23

Tanning industry effluent treatment

Essentially in the manner of the foregoing examples, the effluent waste water from a tanning operation, which is ordinarily deposited directly into a stream or after intervening settling in a settling pond, and containing about 2% tannin, is treated batchwise with the sorbents of Examples 18 and 21 in the manner of Examples 18 and 21. In both cases substantial quantities of tannin are sorbed, the effluent fluid being of substantially less tannin content upon introduction into the stream than prior to the treatment.

The sorbed tannin is recovered from the sorbent by elution in the manner of Examples 20 and 22 and reintroduced into the tanning process.

EXAMPLE 24

Phenol production effluent treatment

Essentially in the manner of the foregoing examples, the effluent waste water from a phenol production unit which is ordinarily deposited directly into a stream or after intervening settling in a settling pond, and containing about 0.5% phenol, is treated batchwise with the sorbents of Examples 18 and 21 in the manner of Examples 18 and 21. In both cases substantial quantities of phenol are sorbed, the effluent fluid being of substantially less phenol content upon introduction into the stream than prior to the treatment.

The sorbed phenol is recovered from the sorbent by elution in the manner of Examples 20 and 22.

EXAMPLE 25

Papermill effluent treatment

Papermill aqueous effluent containing both metal ions and tannin is treated with the sorbents of Examples 18 and 21 by passing the aqueous effluent over a column comprising the sorbent packed therein. In each case the metal content of the effluent and the tannin content of the effluent is substantially reduced. Elution of the columns in the manner of Examples 18 and 22 shows that substantial amounts of tannin and metals, especially copper and iron, have been sorbed.

The effluent stream from a papermill pulping operation is treated in substantially the same manner with the sorbents of Examples 18 and 21 by flowing it through a conduit containing the basic polymer product in each case in particulate form held in the conduit between and by means of two filter plates. Substantially the same results are obtained.

The effluent from a debarking operation is isolated and treated batchwise with the sorbents of Examples 18 and 21 in the manner of those examples. A substantial amount of sorbed tannin is recovered together with the basic polymer product upon filtration, and the resulting effluent is of substantially reduced tannin content.

EXAMPLE 26

Plating industry effluent treatment

Aqueous effluent from a plating operation, having a high metallic content, is treated with the sorbents of Examples 18 and 21 by flowing it over a column packed with the sorbent. In both cases a substantial reduction of metallic ions, especially Cu, Fe, and Cr, in the effluent is effected. The sorbed metal ions are eluted from the column in the manner of Examples 20 and 22 and identified by emission spectroscopy.

In the same manner as given in Examples 20 and 22, other salt solutions are employed for various elutions of sorbed tannins, other phenolics, and metals from the basic polymer sorbents after having been sorbed from an aqueous medium containing same. Since the elution phenomenon appears only to require negatively charged ions to replace those sorbed on the basic or cationic polymers used in the invention, a broad range of salt solutions may be used, including alkali and alkaline earth metal halides, sulfates and the like, as well as the corresponding hydroxides. Low concentrations of eluting solvent are usually employed, as is common in the chromatography art.

In addition to the foregoing examples, application of the basic or cationic polymers of any of the foregoing Preparations 2, 5, 6, 7, 8, 10, 11, 12, 13, or 14 in the procedures set forth in Examples 18–26 produces desirable results in the removal of metal and tannins (and, if desired, also their elution) in the same effective manner as exemplified by employment of these products in Examples 2, 9, 11, 13, 14, 15, 16 and 17.

It will be obvious that other or additional conventional treatments, whether sorption, enzymatic, or of another type, may be used in combination with the sorption process of the present invention, if desired, whatever the aqueous phenolic or metal-containing medium subjected to the sorption treatment.

In the manner of the various sorption operations described in the preceding examples, insoluble basic polymer products including the amides, imides, esters and mixtures thereof, prepared as described using dilower-alkylamino-lower - alkylamines, monolower-alkylaminolower-alkylamines, aminolower-alkylamines, dilower-alkylamino-lower-alkyl-alcohols, monolower-alkylamino-lower-alkyl-alcohols, and amino-lower-alkylamino-alcohols, are used in sorption of phenolics, including tannins, and metal ions, especially copper and iron, from aqueous media containing the same, in each case to give a medium having substantially lower phenolic and metal ion contents. Phenolics, including tannins, are recoverable in each case by elution if desired.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

We claim:

1. Process for the removal of metals from aqueous media in which the metals are present in low concentration which comprises the steps of contacting such metal containing aqueous medium with an insoluble basic polymer containing basic or cationic groups, said polymer being polycationic or polyampholytic in nature wherein the basic or cationic character of the polymer is due to presence therein of free amine, protonated amine, or quaternary amine moieties and wherein residual reactive sites of the insoluble basic polymer comprise about 35% to about 100% basic cationic groups, and maintaining the insoluble basic polymer and aqueous medium in contact for a sufficient period to allow sorption of metallic components by the polymer, thereby removing such components from the medium.

2. Process of claim 1, wherein said basic or cationic groups comprise about 60% to about 100% of said residual reactive sites.

3. Process of claim 1, wherein insoluble basic polymer is recovered and recycled in the process.

4. Process of claim 1, wherein the aqueous medium treated contains tannin and metal ions and wherein components removed during said sorption treatment include tannins and metal ions.

5. Process of claim 1, wherein the sorbed metal is subsequently eluted from the basic polymer sorbent using a dilute basic or salt solution.

6. Process of claim 1, wherein the sorption is effected using a basic polymer selected from the group consisting of basic ethylene/maleic anhydride copolymers,
basic styrene/maleic anhydride copolymers,
basic 2-methyl-pentene-1/maleic anhydride copolymers,
basic styrene/maleic anhydride copolymers,
basic vinyl methyl ether/maleic anhydride copolymers,
basic vinylacetate/maleic anhydride copolymers,
basic divinyl ether/maleic anhydride cyclocopolymers,
basic $\alpha$-methylstyrene/maleic anhydride copolymers,
basic polymaleic anhydride polymers,
basic polyacrylic anhydride polymers,
basic polyacrylic acid polymers, and
basic polymethacrylic acid polymers, in each case containing basic or cationic groups covalently bound in the molecule.

7. Process of claim 1, wherein the polymer employed is a basic or cationic EMA-type polymer.

8. Process of claim 1, wherein the polymer employed is a basic or cationic EMA or IBMA polymer.

9. Process of claim 1, wherein contact of aqueous medium with basic polymer is by adding basic polymer batchwise to the medium, followed by removal of basic polymer after a suitable contact time.

10. Process of claim 1, wherein the aqueous medium is contacted with a column comprising the basic polymer for purposes of effecting the sorption.

11. Process of claim 1, wherein contact of aqueous medium and basic polymer is effected by means of a filter unit comprising the basic polymer.

12. Process of claim 1, wherein the pH range of the aqueous medium treated is 3 to about 9.

References Cited

UNITED STATES PATENTS

| | | | |
|---|---|---|---|
| 2,296,952 | 9/1942 | Ross et al. | 260—627HX |
| 2,334,620 | 11/1943 | Goodell | 260—627HX |
| 2,591,573 | 4/1952 | McBurney | 260—2.1E |
| 2,782,241 | 2/1957 | Gray et al. | 260—627HX |
| 2,861,948 | 11/1958 | McKellar | 260—627X |
| 2,911,363 | 11/1959 | Kissling | 260—627X |
| 3,078,140 | 2/1963 | Hatch | 210—37X |
| 3,146,107 | 8/1964 | Elder et al. | 99—48X |
| 3,398,092 | 8/1968 | Fields et al. | 210—24 |

OTHER REFERENCES

Chasanov, M. G., et al., Sorption of Phenols by Anion Exchange Resins, Ind. & Eng., Chem., vol. 48, February 1956, pp. 305–309.

MICHAEL ROGERS, Primary Examiner

U.S. Cl. X.R.

99—48; 210—37, 38; 260—2.1, 627

UNITED STATES PATENT OFFICE
CERTIFICATE OF CORRECTION

Patent No. __3,597,351__ Dated __3 August 1971__

Inventor(s) __Kurt A. Ladenburg, et al.__  -1-

It is certified that error appears in the above-identified patent and that said Letters Patent are hereby corrected as shown below:

| | |
|---|---|
| Column 2, line 36<br>Application Page 3, line 8: | "therein low"<br>    should read<br>--- therein in low --- |
| Column 2, line 45<br>Application Page 3, line 15: | "equeous"<br>    should read<br>--- aqueous --- |
| Column 3, line 3<br>Application Page 4, lines 10 and 11: | "purificcation"<br>    should read<br>--- purification --- |
| Column 5, line 14<br>Application Page 8, line 29: | "oridases"<br>    should read<br>--- oxidases --- |
| Column 5, line 34<br>Application Page 9, line 17: | "difuctional"<br>    should read<br>--- difunctional --- |
| Column 9, lines 59-60<br>Application Page 18, line 19: | "centifugation"<br>    should read<br>--- centrifugation --- |
| Column 7, line 10<br>Application Page 12, line 28: | "propylene"<br>    should read<br>--- propylene, --- |

UNITED STATES PATENT OFFICE
CERTIFICATE OF CORRECTION

Patent No. 3,597,351      Dated 3 August 1971

Inventor(s) Kurt A. Ladenburg et al.      -2-

It is certified that error appears in the above-identified patent and that said Letters Patent are hereby corrected as shown below:

Column 9, line 38  
Application Page 17, line 31:  
     "croolinking"  
         should read  
     --- crosslinking ---

Column 10, line 27  
Application Page 19, line 25:  
     "tannis"  
         should read  
     --- tannins ---

Column 12, lines 50 and 51  
Application Page 24, line 2:  
     "dimethylaminepropylamine"  
         should read  
     --- dimethylaminopropylamine ---

Column 12, line 56  
Application Page 24, line 7:  
     "litres"  
         should read  
     --- liters ---

Column 13, line 33  
Application Page 25, line 21:  
     "(half-ester,"  
         should read  
     --- Half-Ester, ---

Column 15, lines 40, and 41  
Application Page 31, Table IV; last two lines:  
     "-MP-1/MA.DMAPAI (100)" (Line 40)  
     "MA.DMAPAI (100)" (Line 41)  
         should read  
     --- 2-MP-1/MA.DMAPAI (100) ---  
     --- SMA.DMAPAI (100) ---

Column 16, line 12  
Application Page 33, line 6:  
     "ethylene maleic"  
         should read  
     --- ethylene/maleic ---

E-48    Serial No. 763,351    Filed: 27 September 1968
UNITED STATES PATENT OFFICE
CERTIFICATE OF CORRECTION Patent No. 3,597,351                    Dated 3 August 1971

Inventor(s) Kurt A. Ladenburg, et al.                    -3-

It is certified that error appears in the above-identified patent and that said Letters Patent are hereby corrected as shown below:

| | |
|---|---|
| Column 16, line 58<br>Application Page 33, line 34: | "monolower-alkylamines"<br>　　should read<br>　　--- aminolower-alkylamines --- |
| Column 16, line 71<br>Application page 34, line 11: | "(whatman No. 1)"<br>　　should read<br>　　--- (Whatman No. 1) --- |
| Column 20, Claim 6, line 5<br>Application Claim 13, line 4: | "basic styrene/maleic anhydride copolymers,"<br>　　should read<br>　　--- basic isobutylene/maleic anhydride copolymers, --- |

Signed and sealed this 4th day of April 1972.

(SEAL)
Attest:

EDWARD M. FLETCHER, JR.　　　　　　ROBERT GOTTSCHALK
Attesting Officer　　　　　　　　　Commissioner of Patents